United States Patent

[11] 3,581,612

| [72] | Inventor | Arthur E. Jackman<br>42 Old Meadow Plain Road, Simsbury, Conn. 06070 |
|---|---|---|
| [21] | Appl. No. | 853,287 |
| [22] | Filed | Aug. 27, 1969 |
| [45] | Patented | June 1, 1971 |

[54] CUTTING TOOL
9 Claims, 3 Drawing Figs.

[52] U.S. Cl. .................................................. 82/35, 82/20
[51] Int. Cl. ................................................... B23b 3/24
[50] Field of Search .................................... 82/35, 20; 279/1

[56] References Cited
UNITED STATES PATENTS

| 1,228,570 | 6/1917 | Kupp .............................. | 82/35 |
| 1,683,253 | 9/1928 | McConnell ..................... | 82/35 |
| 2,323,834 | 7/1943 | Moller ............................ | 82/35 |
| 3,309,951 | 3/1967 | Patt ................................ | 82/35 |

*Primary Examiner*—Leonidas Vlachos
*Attorney*—McCormick, Paulding and Huber

ABSTRACT: A rotatable cutting tool for turning axially elongated workpieces and having a plurality of circumaxially spaced radially movable jaws for clampingly engaging a cylindrical bushing having a coaxial bore for journaling a workpiece to be cut as it is advanced axially therethrough. Each jaw carries a cutter for engaging an advancing workpiece. Preferably, the bushing is selected from a plurality of bushings, each of the bushings corresponding to a selected workpiece to be cut and having a bore diameter equal to the major cross-sectional dimension of the workpiece. The outside and bore diameters of each of the bushings are so related that clamping a selected bushing between the jaws effects automatic adjustment of the cutters to produce a finish cut of predetermined diameter or configuration.

PATENTED JUN 1 1971
3,581,612
FIG. 1
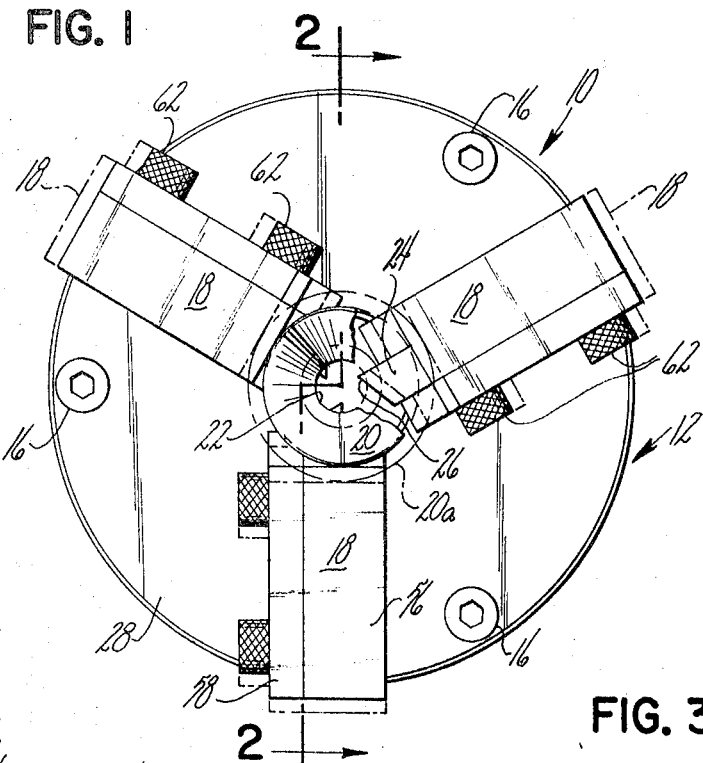
FIG. 2
FIG. 3
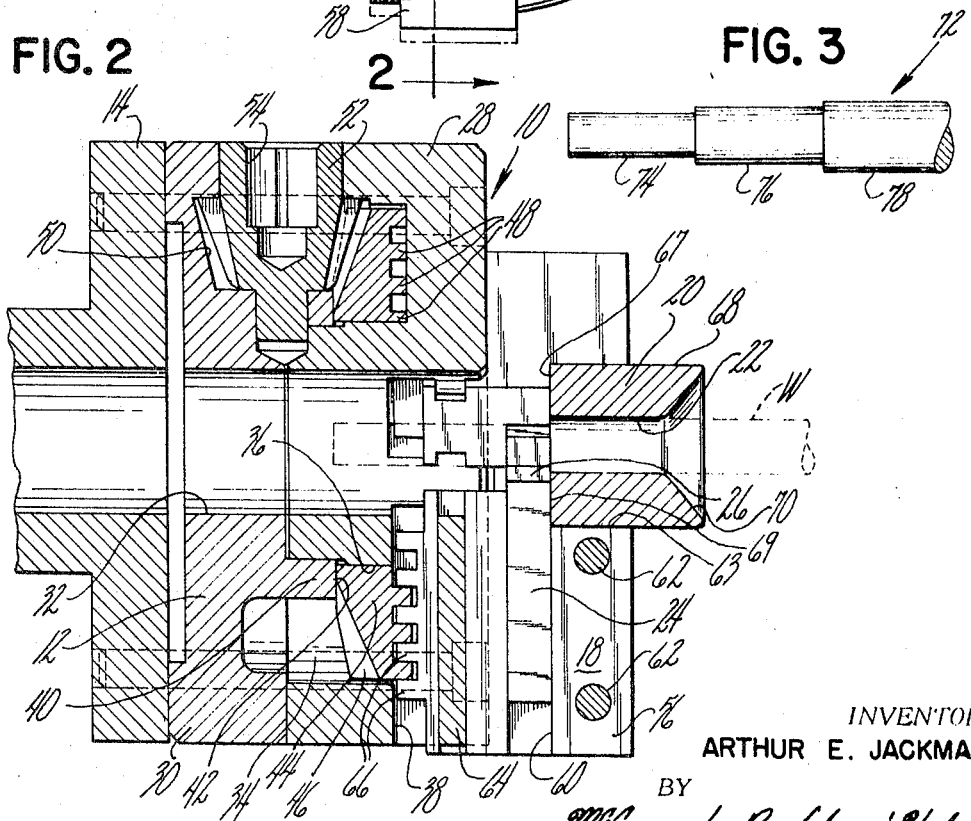
INVENTOR.
ARTHUR E. JACKMAN
BY
McCormick, Paulding & Huber
ATTORNEYS

CUTTING TOOL

BACKGROUND OF THE INVENTION

This invention relates in general to cutting or turning tools and deals more particularly with a tool for turning axially elongated workpieces.

The general aim of the present invention is to provide an improved tool of the aforedescribed type for turning or pointing wire rod and like material. A more particular object of the invention is to provide an improved cutting tool which may be rapidly and accurately adjusted to accommodate a workpiece selected from a group of workpieces ranging in size, as, for example, a wire selected from a group of wires of varying gauge, to turn at least a portion of the workpiece to a predetermined diameter.

SUMMARY OF THE INVENTION

In accordance with the present invention, a cutting tool is provided which includes a rotatable chuck body having a plurality of circumaxially spaced radially movable jaws. A bushing clampingly engaged and retained by the jaws has a bore diameter adapted for reception and passage of a corresponding workpiece to be cut and serves to automatically position at least one cutter carried by an associated one of the jaws to produce a finish cut of a predetermined diameter or configuration when the jaws are moved into clamping engagement with the bushing.

BRIEF DESCRIPTION OF THE DRAWINGS

FIG. 1 is an end view of a cutting tool embodying the present invention with a portion of the bushing thereof broken away to reveal the cutter therebehind, another somewhat larger bushing being indicated by broken lines.

FIG. 2 is a vertical sectional view taken generally along the line 2-2 of FIG. 1, and shows the tool mounted on the faceplate of a lathe.

FIG. 3 is a fragmentary side elevational view of a gauge for use in adjusting the cutting tool of FIGS. 1 and 2.

DETAILED DESCRIPTION OF THE PREFERRED EMBODIMENT

Turning now to the drawing and referring particularly to FIGS. 1 and 2, a cutting tool embodying the present invention and particularly adapted for cutting and turning axially elongated workpieces is indicated generally at 10. The tool 10 comprises a rotatable chuck body designated by the numeral 12 and shown secured to a lathe faceplate 14 by fasteners 16, 16. A plurality of circumaxially spaced and radially movable clamping jaws 18, 18 supported on the chuck body clampingly engage and retain a bushing 20 for coaxial rotation with the chuck body 12. The bushing 20 has a bore 22 therethrough for reception and passage of a workpiece to be cut. A typical workpiece is designated by the letter W in FIG. 2 and may, for example, comprise a length of wire or rod stock. The cutting tool of the present invention also includes at least one cutter carried by and movable with an associated one of the jaws. In the illustrated case, the cutting tool 10 has three cutters 24, 24. Each cutter is mounted in an associated jaw 16 and has a cutting edge 26 spaced radially inwardly of the bore 22 for cutting engagement with the workpiece W as it is advanced through the bore.

The tool 10 may be provided with a single bushing adapted to accommodate a workpiece of a particular size or gauge, but preferably, it is adapted for adjustment to accommodate a workpiece selected from a group of workpieces ranging in size or gauge. Accordingly, a plurality of bushings are provided, each bushing corresponding to a respective one of the workpieces in the group. An important feature of the invention resides in the relationship between the various bushings which correspond to the workpieces to be cut and the manner in which these bushings cooperate with the jaws to effect automatic cutter adjustment, as will be hereinafter further evident.

Considering the illustrated cutting tool 10 in further detail it will be noted that the body and jaw portions of the tool are similar in many respects to corresponding parts of a chuck of the so-called universal type. The chuck body 14 is preferably generally cylindrical and comprises mating front and rear parts respectively indicated at 28 and 30 and has a coaxial bore 32 therethrough which is at least equal to the finish diameter of the largest workpiece to be cut. The forward part 28 has a rearwardly opening annular recess 34 formed therein and partially defined by a radially outwardly facing annular bearing surface 36. A circumaxially spaced series of jaw receiving slots 38, 38 equal in number to the number of jaws 16, 16 are formed in the front part 28 and extend radially therethrough. Each slot 38 has a cross-sectional configuration complementing the cross-sectional configuration of an associated jaw 18, opens through the forward face of the front part 28 and communicates with the annular recess 34. The rear part 28 has an axially forwardly projecting annular shoulder 40 which extends for some distance into the recess 34 and includes a radially disposed forwardly facing bearing surface 42.

An annular gear ring 44 received within the recess 34 and journaled on the bearing surface 36 has a circumaxially spaced series of rearwardly facing bevelled gear teeth 46, 46 and a radially spaced series of spirally arranged forwardly projecting teeth 48, 48. The forwardly facing bearing surface 42 engages an associated rearwardly facing bearing surface on the gear ring 44 to retain it in the recess 34 for rotation relative to the bearing surface 36. The front and rear parts 28 and 30 also cooperate to define at least one radially outwardly opening recess 50 for receiving and journaling an adjusting gear 52 which matingly engages the teeth 46, 46. A radially outwardly opening socket 54 formed in the gear 52 is provided to receive a wrench (not shown) for adjusting the tool as will be hereinafter further discussed.

Each jaw is slidably received in an associated slot 38 and projects axially forwardly beyond the forward face of the front part 28 as shown in FIG. 2. Referring now particularly to the lower jaw 18 as it appears oriented in FIGS. 1 and 2, the jaw includes two mating parts 56 and 58 which cooperate to define a radially extending recess 60 of generally rectangular cross section which complements the cross section of an associated cutter 24 received therein. A pair of clamp screws 62, 62 extend through the part 58 and threadably engage the part 56 to releasably retain the cutter 24 in the jaw. The jaw part 56 has a radially inwardly facing clamping surface 63 and extends rearwardly into the slot 38. Radially extending ribs 64, 64 project outwardly from opposite sides of the part 56 and complement portions of the slot 38 to retain the jaw therein. A plurality of radially spaced apart teeth 66, 66 which project rearwardly from the jaw part 56 matingly engage the teeth 48, 48 on the gear ring 44. It will now be evident that rotation of the adjusting gear 52 in one and in opposite directions causes corresponding movement of the gear ring 44 which moves the jaws 16, 16 and the cutters 24, 24 associated therewith radially inwardly or outwardly relative to the chuck body 12.

The bushing 20 may take various forms, but preferably, and as shown, it has a generally cylindrical peripheral bearing surface 68 coaxially aligned with the bore 22 and a radially disposed and rearwardly facing seating surface 67 for engaging an associated forwardly facing abutment surface 69 on each cutter when the bushing is clamped between the jaws. At least a portion of the bore 22 is generally cylindrical and has a diameter substantially equal to the maximum cross-sectional diameter of a workpiece to be cut to provide a journal for the workpiece as it passes therethrough. In the illustrated embodiment 10, the bushing 20 is provided with a conical guide portion 70 which diverges rearwardly to the cylindrical portion of the bore to guide the workpiece W into the cylindrical portion as it is fed into the rotating tool 10.

A typical gauge used in adjusting the tool 10 is illustrated in FIG. 3 and designated by the numeral 72. The gauge includes a plurality of coaxial aligned adjacent cylindrical sections indicated at 74, 76 and 78, respectively. The section 76 has a diameter substantially equal to the diameter of the workpiece W and to the diameter of the cylindrical bore portion 20 in which it is adapted to be received. When the section 76 is positioned in the bore, the smaller adjacent section 74, which has a diameter substantially equal to the finish diameter of the workpiece W, is aligned with the cutters 24, 24. The cutters may then be adjusted with respect to the jaws to engage the section 74.

In FIG. 1, another bushing somewhat larger than the bushing 20 and adapted to accommodate a workpiece of somewhat larger size then the workpiece W is indicated in broken lines and designated at 20a. The relationship between the outside and bore diameters of the bushing 20 and the bushing 20a are such that when the latter bushing is clamped in the jaws the cutters 24, 24 will be automatically positioned to cut or reduce the larger workpiece to a predetermined diameter. It will now be evident that by providing a plurality of bushings of selected dimension, a tool made in accordance with the present invention may be rapidly and accurately adjusted to perform a predetermined cutting operation on a workpiece selected from a plurality of workpieces differing in size by the simple expedient of employing the bushing which corresponds to the selected workpiece to be cut.

The invention has been described with reference to a tool for reducing at least a portion of a selected workpiece to a predetermined diameter, however, it should be understood that the tool may be employed to reduce a workpiece to a predetermined diameter throughout its entire length. It will be evident that a tool constructed in accordance with the present invention may also be used to alter the cross-sectional configuration of a given workpiece, as, for example, to chamfer the workpiece or to form desired radii thereon, and such embodiments are contemplated within the scope of the present invention.

I claim:

1. An apparatus for cutting an axially elongated workpiece, said apparatus comprising a rotatable chuck body, a plurality of clamping jaws supported on said chuck body for radial movement relative thereto, each of said jaws having a generally radially inwardly facing clamping surface, a bushing having a generally radially outwardly facing peripheral bearing surface and including a coaxial bore therethrough, for reception and passage of a workpiece to be cut, said bushing being adapted to be received between and retained by said jaws with said clamping surface of each of said jaws clampingly engaging said bearing surface for coaxial rotation with said chuck body, and at least one cutter carried by and movable with an associated one of said jaws and having a cutting edge thereon spaced radially inwardly of said bore when said one jaw is in clamping engagement with said bushing for cutting engagement with the workpiece as it passes through said bore.

2. An apparatus for cutting an axially elongated workpiece as set forth in claim 1 wherein said peripheral surface is generally cylindrical and coaxially aligned with said bore and at least a portion of said bore is generally cylindrical and has a diameter substantially equal to the maximum cross-sectional dimension of a workpiece to be cut.

3. An apparatus for cutting an axially elongated workpiece as set forth in claim 2 wherein said chuck body has a bore therethrough coaxially aligned with said bushing bore when said bushing is received between and retained by said jaws, said chuck body bore having a minimum cross-sectional dimension at least equal to the maximum cross-sectional dimension of the largest workpiece to be cut.

4. An apparatus for cutting an axially elongated workpiece as set forth in claim 1 wherein said bushing bore includes a generally conical guide diverging to said cylindrical portion.

5. An apparatus for cutting an axially elongated workpiece as set forth in claim 1 including means for simultaneously moving said jaws radially inwardly and outwardly relative to said chuck body.

6. An apparatus for cutting an axially elongated workpiece as set forth in claim 1 including means for releasably retaining said one cutter in said associated jaw.

7. An apparatus for cutting an axially elongated workpiece as set forth in claim 1 wherein said one cutter has a generally radially disposed forwardly facing abutment surface extending radially inwardly beyond said clamping surface of said associated jaw, and said bushing has a generally radially disposed rearwardly facing seating surface for engaging said abutment surface when said bushing is retained in said chuck body by said jaws.

8. An apparatus as set forth in claim 1 for cutting an axially elongated workpiece selected from a group of workpieces, each of the workpieces in the group having a major cross-sectional dimension differing from the major cross-sectional dimension of all of the other workpieces in the group, said bushing consisting of one of a plurality of bushings each corresponding to a respective one of the workpieces in the group and each selectively receivable by said jaws for use with the respectively associated workpiece.

9. An apparatus for cutting an axially elongated workpiece as set forth in claim 8 and for reducing a portion of said selected workpiece to a predetermined configuration wherein each of said bushings is generally cylindrical, at least a portion of the bore of each of said bushings is generally cylindrical, the relationship between the diameter of said cylindrical bore portion and the outside diameter of said corresponding bushing being such that said cutter is automatically positioned to reduce said selected workpiece portion to said predetermined configuration when said corresponding bushing is clampingly engaged by said jaws.